United States Patent
Li et al.

(10) Patent No.: US 8,902,289 B2
(45) Date of Patent: Dec. 2, 2014

(54) METHOD FOR CAPTURING THREE DIMENSIONAL IMAGE

(75) Inventors: Yun-Chin Li, New Taipei (TW); Chan-Min Chou, Hsinchu County (TW); Chin-Lung Yang, Miaoli County (TW)

(73) Assignee: Altek Corporation, Hsinchu (TW)

( * ) Notice: Subject to any disclaimer, the term of this patent is extended or adjusted under 35 U.S.C. 154(b) by 736 days.

(21) Appl. No.: 13/194,985

(22) Filed: Jul. 31, 2011

(65) Prior Publication Data

US 2012/0169846 A1   Jul. 5, 2012

(30) Foreign Application Priority Data

Dec. 30, 2010   (TW) ................................ 99146930 A

(51) Int. Cl.
 *H04N 13/02* (2006.01)
 *G03B 35/06* (2006.01)
(52) U.S. Cl.
 CPC ...................................... *G03B 35/06* (2013.01)
 USPC ..................................... 348/46; 348/E13.074
(58) Field of Classification Search
 None
 See application file for complete search history.

(56) References Cited

U.S. PATENT DOCUMENTS

| | | | |
|---|---|---|---|
| 6,798,406 B1 * | 9/2004 | Jones et al. | 345/419 |
| 2002/0018062 A1 | 2/2002 | Hamaguchi | |
| 2006/0204239 A1 | 9/2006 | Inaba | |
| 2007/0165129 A1 * | 7/2007 | Hill et al. | 348/335 |
| 2008/0080852 A1 | 4/2008 | Chen et al. | |
| 2010/0290483 A1 * | 11/2010 | Park et al. | 370/472 |
| 2011/0255775 A1 * | 10/2011 | McNamer et al. | 382/154 |

FOREIGN PATENT DOCUMENTS

| | | |
|---|---|---|
| CN | 1207504 | 2/1999 |
| CN | 101726860 | 6/2010 |
| JP | 2006-113807 | 4/2006 |
| JP | 2009-212728 | 9/2009 |
| JP | 2010-283466 | 12/2010 |
| TW | I243595 | 11/2005 |
| TW | I290661 | 12/2007 |
| TW | 200818865 | 4/2008 |
| TW | I314832 | 4/2008 |

OTHER PUBLICATIONS

Color Image Quantization Algorithm for Three Dimension Displays Based on Ordered Dither Method, IBM TDB v39 n6 06-96 p. 187-188, Jun. 1, 1996, Miyazawa et al.*
"Office Action of Taiwan counterpart application" issued on Jul. 16, 2013, p.1-p.7.
"First Office Action of China Counterpart Application", issued on Apr. 4, 2014, p. 1-p. 7.

* cited by examiner

*Primary Examiner* — Sath V Perungavoor
*Assistant Examiner* — Janese Duley
(74) *Attorney, Agent, or Firm* — Jianq Chyun IP Office

(57) ABSTRACT

A method for capturing a three dimensional (3D) image by using a single-lens camera is provided. First, a first image is captured. According to a focus distance of the single-lens camera in capturing the first image and an average distance between two human eyes, an overlap width between the first image and a second image required for capturing the second image of the 3D image is calculated. Then, the first image and a real-time image captured by the single-lens camera are displayed, and an overlap area is marked on the first image according to the calculated overlap width. A horizontal shift of the single-lens camera is adjusted, to locate the real-time image in the overlap area. Finally, the real-time image is captured as the second image, and the first and second images are output as the 3D image.

8 Claims, 3 Drawing Sheets

METHOD FOR CAPTURING THREE DIMENSIONAL IMAGE

CROSS-REFERENCE TO RELATED APPLICATION

This application claims the priority benefit of Taiwan application serial no. 99146930, filed Dec. 30, 2010. The entirety of the above-mentioned patent application is hereby incorporated by reference herein and made a part of this specification.

BACKGROUND OF THE INVENTION

1. Field of the Invention

The present invention generally relates to a method for capturing an image, in particular, to a method for capturing a three dimensional (3D) image.

2. Description of Related Art

A stereo camera consists of two lenses having the same specifications, and a distance between the two lenses is about 7.7 cm, thus simulating an actual distance between a person's eyes. Parameters of the two lenses, such as focal lengths, apertures, and shutters are controlled by a processor of the stereo camera. By triggering through a shutter release, images of the same area but of different perspectives are captured and used for simulating a left-eye image and a right-eye image of a human.

The left-eye image and the right-eye image captured by the stereo camera are alternately displayed by a display device at a frequency exceeding persistence of vision of the human eyes, and meanwhile with the switching of liquid crystal shutter glasses worn on the human head, a human can view the corresponding left-eye image and the right-eye image with the left and right eyes. After being conducted to the cerebral cortex, the left-eye image and the right-eye image are fused into a single image by the cortical centre. Since the left-eye image and the right-eye image captured by the stereo camera may be slightly different in angles, a certain parallax exists between two object images formed on the retinas, and the object images of different perspectives in the two eyes can be fused by the cortical centre to make a human have a three dimensional impression.

Presently, the common method for capturing a 3D image is performed by using a stereo camera having two lenses. As long as capturing parameters are adjusted to be consistent with each other, a 3D image with a good imaging effect can be captured. However, in the structure of this type of stereo camera, two groups of lenses and sensors are required, and thus the cost is high. Another method for capturing a 3D image is to capture the image by horizontally moving a single-lens camera. However, the most significant problem in the method is the stability, that is, when the user does not accurately control the horizontal shift, the parallax is likely to become too large or too small, which will influence the imaging effect of the 3D image.

SUMMARY OF THE INVENTION

Accordingly, the present invention is directed to a method for capturing a 3D image, which is capable of capturing a 3D image with a good imaging effect by using a single-lens camera.

The present invention provides a method for capturing a 3D image, for capturing a 3D image by using a single-lens camera, which includes the following steps. First, a first image is captured, and according to a focus distance of the single-lens camera in capturing the first image and an average distance between two human eyes, an overlap width between the first image and a second image required for capturing the second image of the 3D image is calculated. Next, the first image and a real-time image currently captured by the single-lens camera are displayed, and one overlap area is marked on the first image according to the calculated overlap width. Then, a horizontal shift of the single-lens camera is adjusted to locate the real-time image in the overlap area. Finally, the real-time image is captured as the second image.

In an embodiment of the present invention, the step of marking the overlap area on the first image according to the overlap width further includes receiving a selection instruction of a user, so as to mark the overlap area at a left area or a right area of the first image.

In an embodiment of the present invention, the method further includes determining whether the captured first image and second image are a left image and a right image or a right image and a left image according to the selection instruction, and recording the determination result at a header of the first image and the second image.

In an embodiment of the present invention, the step of displaying the first image further includes recognizing multiple features in the first image and displaying the features on the first image.

In an embodiment of the present invention, the step of displaying the real-time image captured by the single-lens camera further includes recognizing multiple features in the real-time image, and displaying the features on the real-time image.

In an embodiment of the present invention, after the step of recognizing the features in the real-time image and the displaying the features on the real-time image, the method further includes comparing the corresponding features in the real-time image and the first image to obtain an overlapping degree of the real-time image and the first image, so as to judge whether the real-time image and the first image are sufficient to form a 3D image.

In an embodiment of the present invention, the step of displaying the first image and the real-time image captured by the single-lens camera includes overlapping and displaying the first image and the real-time image in a manner of proportional fusion.

In an embodiment of the present invention, the step of displaying the first image and the real-time image captured by the single-lens camera includes overlapping and displaying the real-time image on the first image in a semi-transparent manner.

In an embodiment of the present invention, the step of displaying the first image and the real-time image captured by the single-lens camera includes overlapping and displaying the first image and the real-time image in a manner of alternately displaying on scanning lines, in which the first image and the real-time image are displayed on odd-numbered scanning lines or even-numbered scanning lines of a displayed picture respectively.

In an embodiment of the present invention, the step of displaying the first image and the real-time image captured by the single-lens camera includes overlapping and displaying the first image and the real-time image in a manner of displaying with different colors.

Based on the above, according to the method for capturing a 3D image of the present invention, an overlap area corresponding to the left image and the right image of the 3D image and/or corresponding feature points in the two images are marked on the screen, so that the user is able to know the overlapping degree of the left and the right images, so as to capture a 3D image with a good imaging effect.

In order to make the aforementioned features and advantages of the present invention more comprehensible, embodiments are described in detail below with the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
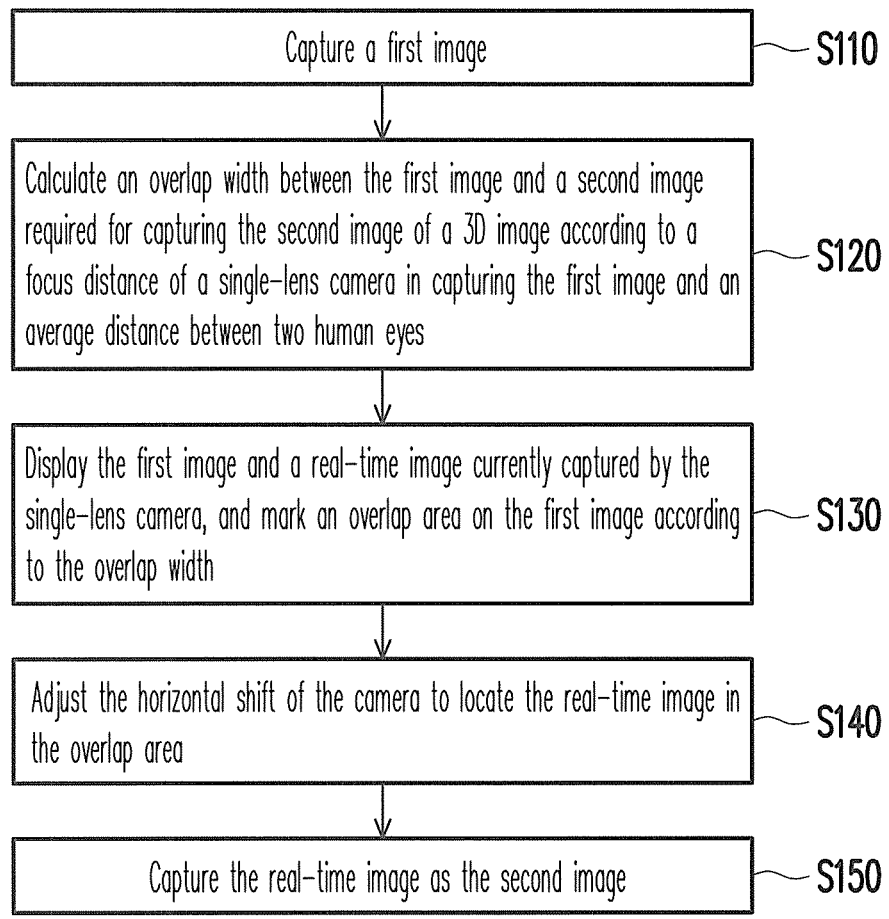
FIG. 1 is a flow chart of a method for capturing a 3D image according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

A left image and a right image of a 3D image have an area overlapping with each other, and the size of the overlap area is correlated to the focus distance of the camera when capturing the image. Generally, the longer the focus distance is, the smaller the difference (horizontal shift) between the left image and the right image is; and the shorter the focus distance is, the larger the difference between the left image and the right image is. In the present invention, according to the principle, after an image is captured by using a single-lens camera, an overlap width required for capturing another image is calculated according to the focus distance in capturing, and the two images are overlapped and displayed on a screen of the camera in a semi-transparent or image fusion manner for the user's reference, so as to capture a 3D image with a good imaging effect.

Specifically, FIG. 1 is a flow chart of a method for capturing a 3D image according to an embodiment of the present invention. Referring to FIG. 1, in this embodiment, a single-lens camera is used to capture a 3D image, and the camera has a charge coupled device (CCD), a complementary metal-oxide semiconductor (CMOS), or other photosensitive elements disposed in the lens thereof, for sensing the intensity of the light entering the lens to generate an image. The method of this embodiment includes the following steps.

First, a first image is captured by using a single-lens camera (Step S110). Next, an overlap width between the first image and a second image required for capturing the second image of the 3D image is calculated by the camera according to a focus distance in capturing the first image and an average distance between two human eyes (Step S120). After capturing the first image of the 3D image, the camera of this embodiment immediately calculates an appropriate horizontal distance between adjacent images, which is provided for a user as a reference in view finding.

Specifically, similar to the capturing mode of a common digital camera, after capturing the first image, the camera of this embodiment immediately displays the captured first image on the screen. However, in addition to the first image, the camera of this embodiment will also display a real-time image currently captured by the camera simultaneously, and marks an overlap area on the first image according to the overlap width calculated previously (Step S130). The camera of this embodiment overlaps and displays the first image and the real-time image in the overlap area in different manners, which are provided for the user as a reference for capturing a next image.

Figure 2:
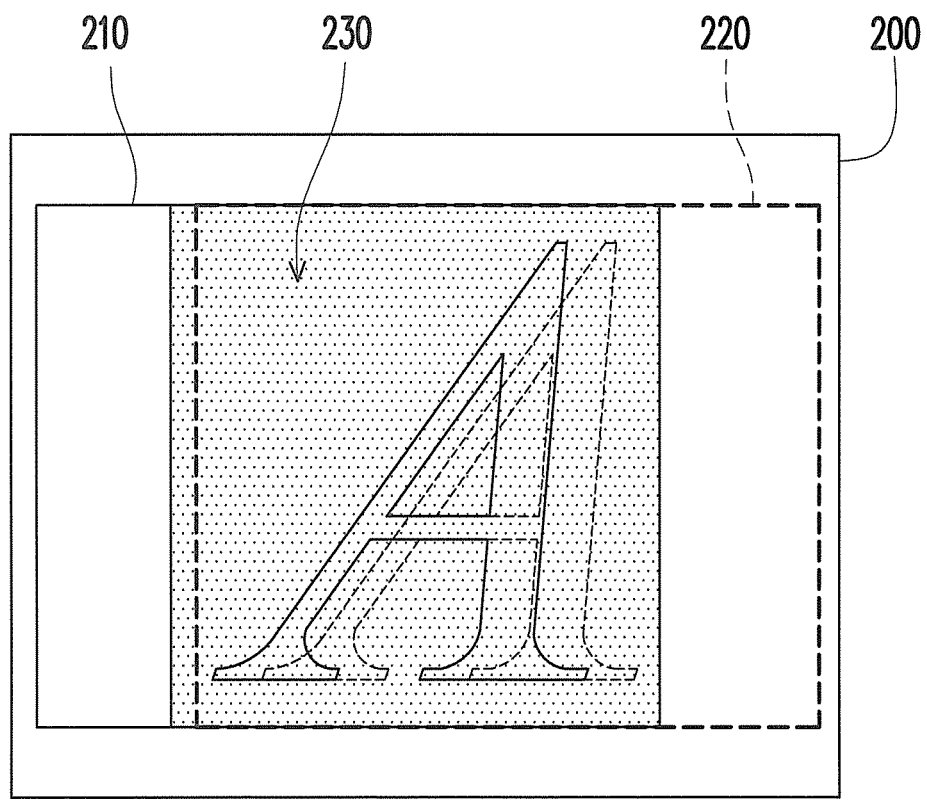
FIG. 2 is an example of overlapping and displaying images according to an embodiment of the present invention.

For example, the camera of this embodiment overlaps and displays the first image and the real-time image in a manner of proportional fusion, or overlaps and displays the real-time image on the first image in a semi-transparent manner so that the user is able to know an overlapping degree of the two images. FIG. 2 is an example of overlapped and displayed images according to an embodiment of the present invention. Referring to FIG. 2, in this embodiment, a first image 210 captured at first is displayed on a screen 200 of the camera, and a real-time image 220 currently captured by the camera is overlapped and displayed on the first image 210 in a semi-transparent manner. Additionally, an overlap area 230 is further marked on the first image 210, to indicate a horizontal shift required for capturing a 3D image, so as to help the user to capture a 3D image with a good imaging effect.

In another aspect, the camera of this embodiment may also overlap and display the real-time image and the first image in a manner of alternately displaying on scanning lines, such that the first image and the real-time image are displayed on odd-numbered scanning lines or even-numbered scanning lines. Furthermore, the camera of this embodiment may also overlap and display the first image and the real-time image in a manner of displaying with different colors, for example, the first image and the real-time image are processed with filters of different colors such as red/green or red/blue, so that the user can distinguish the first image and the real-time image.

It should be noted that, before the step of marking the overlap area, the camera of this embodiment will, for example, first prompt the user with a window, to inquire the user whether a next image to be captured is located at a left area or a right area of the first image. That is, the camera may allow the user to freely choose to firstly capture the left image and then capture the right image or firstly capture the right image and then capture the left image according to his or her shooting habits. When receiving a selection instruction of the user, the camera displays the overlap area in the left area or the right area of the first image, which is provided for the user as a reference when capturing the second image.

Back to Step S130, when the camera displays the first image and the real-time image, the user adjusts the horizontal shift of the camera according to the relevant position relation of the real-time image and the overlap area so as to locate the real-time image in the overlap area (Step S140). Finally, the camera captures the real-time image located in the overlap area, which serves as the second image of the 3D image (Step S150). As the second image captured by the camera is located in the marked overlap area, indicating that the difference between the second image and the first image is consistent with the overlap width calculated previously, the 3D image formed by combining the second image and the first image may exhibit a good 3D imaging effect.

It should be noted that, after capturing the first image and the second image, the camera may further determine the captured first image and second image are a left image and a right image or a right image and a left image according to the previous selection instruction of the user, and record the determination result at a header of the first image and the second image. Thus, the 3D paring relation of the first image and the second image is saved, such that the subsequent mediation software may correctly display a 3D image according to such information when using the first image and the second image.

It should be noted that, in order to ensure the accuracy of overlapping the second image and the first image, the present invention further analyzes feature points in the two images, and displays the feature points when displaying the two images, such that the user can accurately overlap the real-time image on the first image when adjusting the horizontal shift of the camera, so as to capture a 3D image with a good imaging effect. Hereinafter, an embodiment is illustrated in detail.

Figure 3:
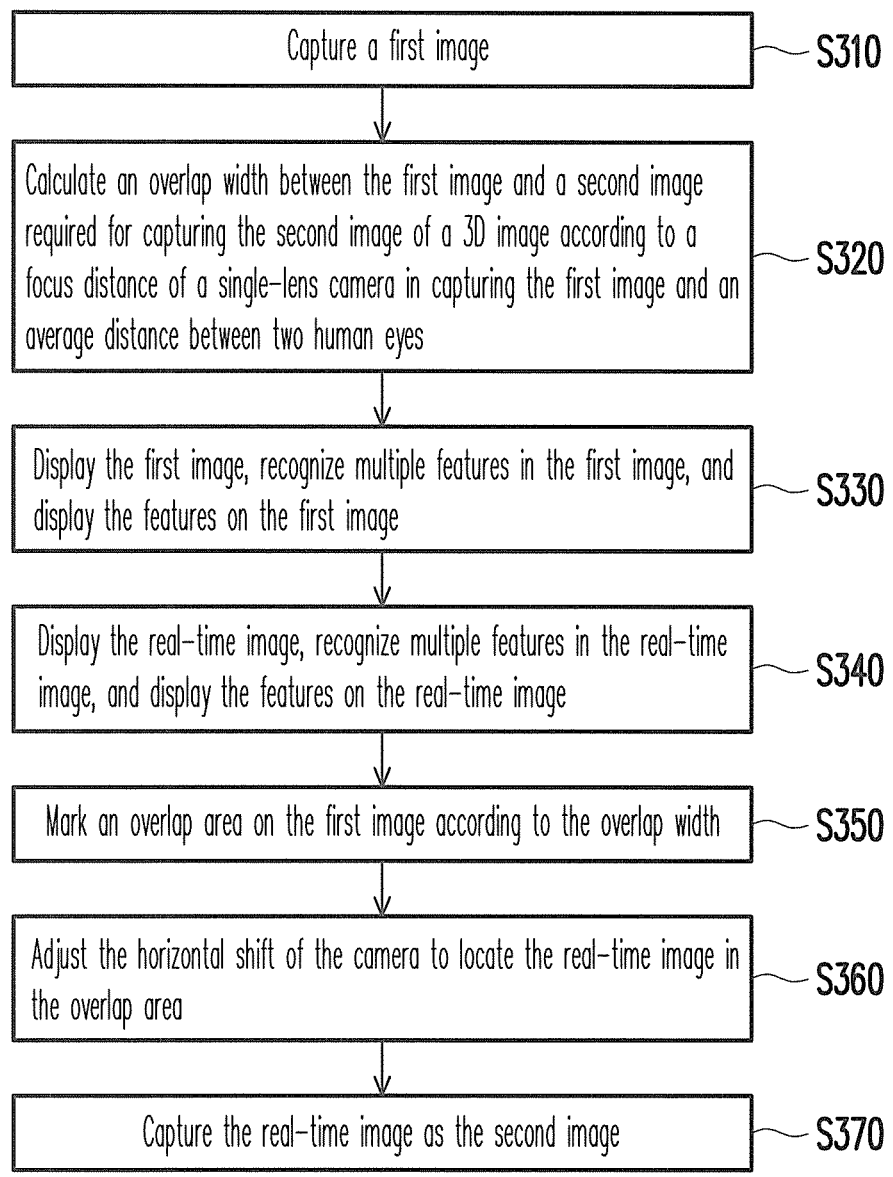
FIG. 3 is a flow chart of a method for capturing a 3D image according to an embodiment of the present invention.

FIG. 3 is a flow chart of a method for capturing a 3D image according to an embodiment of the present invention. Referring to FIG. 3, the method of this embodiment is used for capturing a 3D image by using a single-lens camera, and includes the following steps.

First, a first image is captured by using the single-lens camera (Step S310). Next, an overlap width between the first image and a second image required for capturing the second image of a 3D image is calculated by the camera according to a focus distance in capturing the first image and an average distance between two human eyes (Step S320). The details of Steps S310-S320 are the same as or similar to those of Steps S110-S120, and will not be repeated herein.

The difference between this embodiment and the previous embodiments is as follows: when displaying the first image, the camera of this embodiment further recognizes multiple features in the first image, and displays the features on the first image (Step S330). In another aspect, when displaying the currently captured real-time image, the camera of this embodiment further recognizes multiple features in the real-time image, and displays the features on the real-time image (Step S340). Furthermore, the camera of this embodiment further marks an overlap area on the first image according to the overlap width calculated previously (Step S350). For example, the camera of this embodiment marks the obvious features that can be easily recognized such as edges and corners in the first image and the real-time image in specific colors, such that the user can obtain the overlapping degree of the real-time image and the first image by comparing the corresponding features in the real-time image and the first image, to judge whether the real-time image and the first image are sufficient to form a 3D image.

According to the marked features and the overlap area, the user can adjust the horizontal shift of the camera to locate the real-time image in the overlap area (Step S360), and finally, the real-time image located in the overlap area is captured by the camera, to serve as the second image of the 3D image (Step S370).

The image features and overlap area are marked on the camera screen, and are provided for the user as a reference when moving the camera to capture the second image, so as to help the user to capture a 3D image with the optimal visual effect.

In view of the above, according to the method for capturing a 3D image of the present invention, a 3D image is captured by using a single-lens camera, an overlap width required for capturing another image is calculated by analyzing a focus distance in capturing the first image, and a corresponding overlap area is marked on a screen, so that the user is able to know the overlapping degree of a left image and a right image, so as to capture a 3D image with a good imaging effect. Furthermore, feature points are marked on the images to help the user to adjust the position of the camera, so as to capture a 3D image with a good imaging effect.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for capturing a three dimensional (3D) image by using a single-lens camera, comprising:
   capturing a first image;
   calculating an overlap width between the first image and a second image required for capturing the second image of the 3D image according to a focus distance of the single-lens camera from the step of capturing the first image and an average distance between two human eyes;
   displaying and overlapping the first image and a real-time image currently captured by the single-lens camera in a manner of alternately displaying the first image and the real time image on different scanning lines, wherein the first image and the real-time image are alternatively displayed either on odd-numbered scanning lines or even-numbered scanning lines of a displayed picture, and wherein the first image and the real time image are displayed with different colors;
   marking an overlap area between the first image and the real time image on the first image according to the overlap width;
   adjusting a horizontal shift of the single-lens camera, to locate the real-time image in the overlap area; and
   capturing the real-time image as the second image.

2. The method for capturing a 3D image according to claim 1, wherein the step of marking the overlap area on the first image according to the overlap width further comprises:
   receiving a selection instruction, and marking the overlap area on a left area or a right area of the first image according to the selection instruction.

3. The method for capturing a 3D image according to claim 2, further comprising:
   determining the captured first image and second image are a left image and a right image or a right image and a left image according to the selection instruction, and recording a determination result at a header of the first image and the second image.

4. The method for capturing a 3D image according to claim 1, wherein the step of displaying the first image further comprises:
   recognizing multiple features in the first image, and displaying the features on the first image.

5. The method for capturing a 3D image according to claim 4, wherein the step of displaying the real-time image currently captured by the single-lens camera further comprises:
   recognizing multiple features in the real-time image, and displaying the features on the real-time image.

6. The method for capturing a 3D image according to claim 5, after the step of recognizing the multiple features in the real-time image, and displaying the features on the real-time image, the method further comprising:
   comparing the corresponding features in the real-time image and the first image to obtain an overlapping degree of the real-time image and the first image, so as to judge whether the real-time image and the first image are sufficient to form the 3D image.

7. The method for capturing a 3D image according to claim 1, wherein the step of displaying the first image and the real-time image currently captured by the single-lens camera comprises:
   overlapping and displaying the first image and the real-time image in a manner of proportional fusion.

8. The method for capturing a 3D image according to claim 1, wherein the step of displaying the first image and the real-time image currently captured by the single-lens camera comprises:
   overlapping and displaying the real-time image on the first image in a semi-transparent manner.

\* \* \* \* \*